United States Patent [19]

McBride et al.

[11] 4,359,759
[45] Nov. 16, 1982

[54] BIAS LIGHTING IN A RADIOGRAPHIC APPARATUS AND METHOD

[75] Inventors: Thomas R. McBride, Newbury; Joseph B. Richey, Shaker Heights, both of Ohio

[73] Assignee: Technicare Corporation, Solon, Ohio

[21] Appl. No.: 142,500

[22] Filed: Apr. 21, 1980

[51] Int. Cl.³ .............................................. H04N 7/18
[52] U.S. Cl. ................................. 358/111; 358/221; 358/223; 378/99
[58] Field of Search ................. 358/111, 221, 223; 250/416 TV

[56] References Cited

U.S. PATENT DOCUMENTS

| | | | |
|---|---|---|---|
| 3,573,461 | 4/1971 | Ohlsson | 250/95 |
| 3,582,651 | 6/1971 | Siedband | 250/93 |
| 3,590,145 | 6/1971 | Schneider | 358/223 |
| 3,784,816 | 1/1974 | Abrahamsson | 250/273 |
| 3,848,130 | 11/1974 | Macouski | 250/369 |
| 4,029,948 | 6/1977 | Hounsfield | 358/111 |
| 4,031,551 | 6/1977 | Nobutoki | 358/223 |
| 4,145,722 | 3/1979 | Takeuti | 358/223 |
| 4,204,225 | 5/1980 | Mistretta | 250/416 TV |
| 4,215,365 | 7/1980 | Haendle | 358/111 |
| 4,216,494 | 8/1980 | Ohshima | 358/223 |

*Primary Examiner*—Howard Britton
*Attorney, Agent, or Firm*—Michael A. Kaufman

[57] ABSTRACT

The radiographic system includes an x-ray source for irradiating a patient with x-radiation. An image intensifier receives the x-radiation which has traversed the patient and produces an optical image of a radiation shadowgraph of the examined area of the patient. A television camera converts the optical image into a video signal. An image processor stores each frame of the video signal generated by the television camera as an electronic image of the optical image viewed on the image intensifier. Alternately, a plurality of frames from the television camera may be combined to produce a composite image. A bias light is provided adjacent the target of a television camera to illuminate the target before an optical image from the image intensifier is monitored by the television camera. This improves the linearity of the response of the television camera, particularly to low amplitude light intensities on the first few video frames generated by the camera.

7 Claims, 4 Drawing Figures

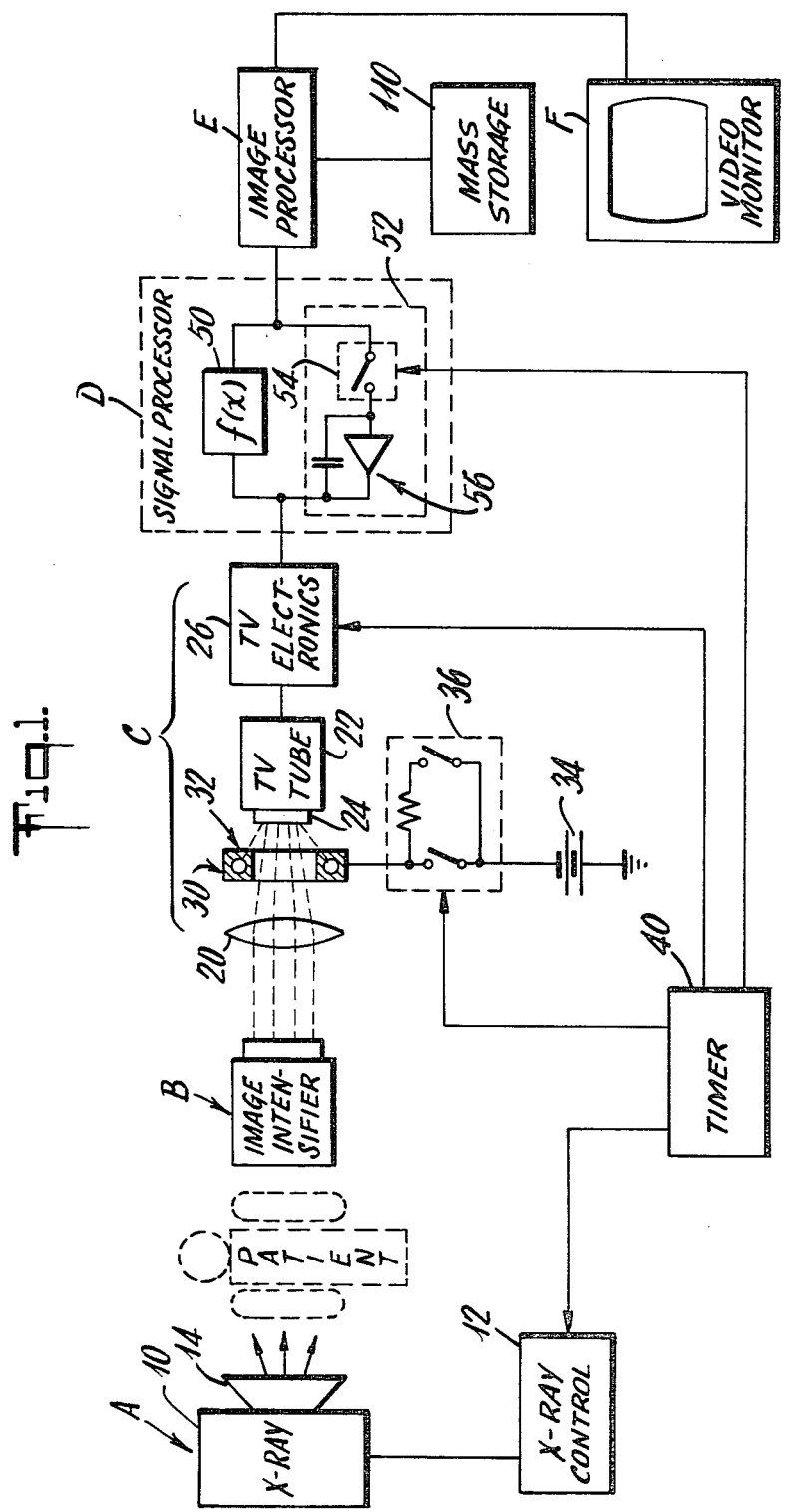

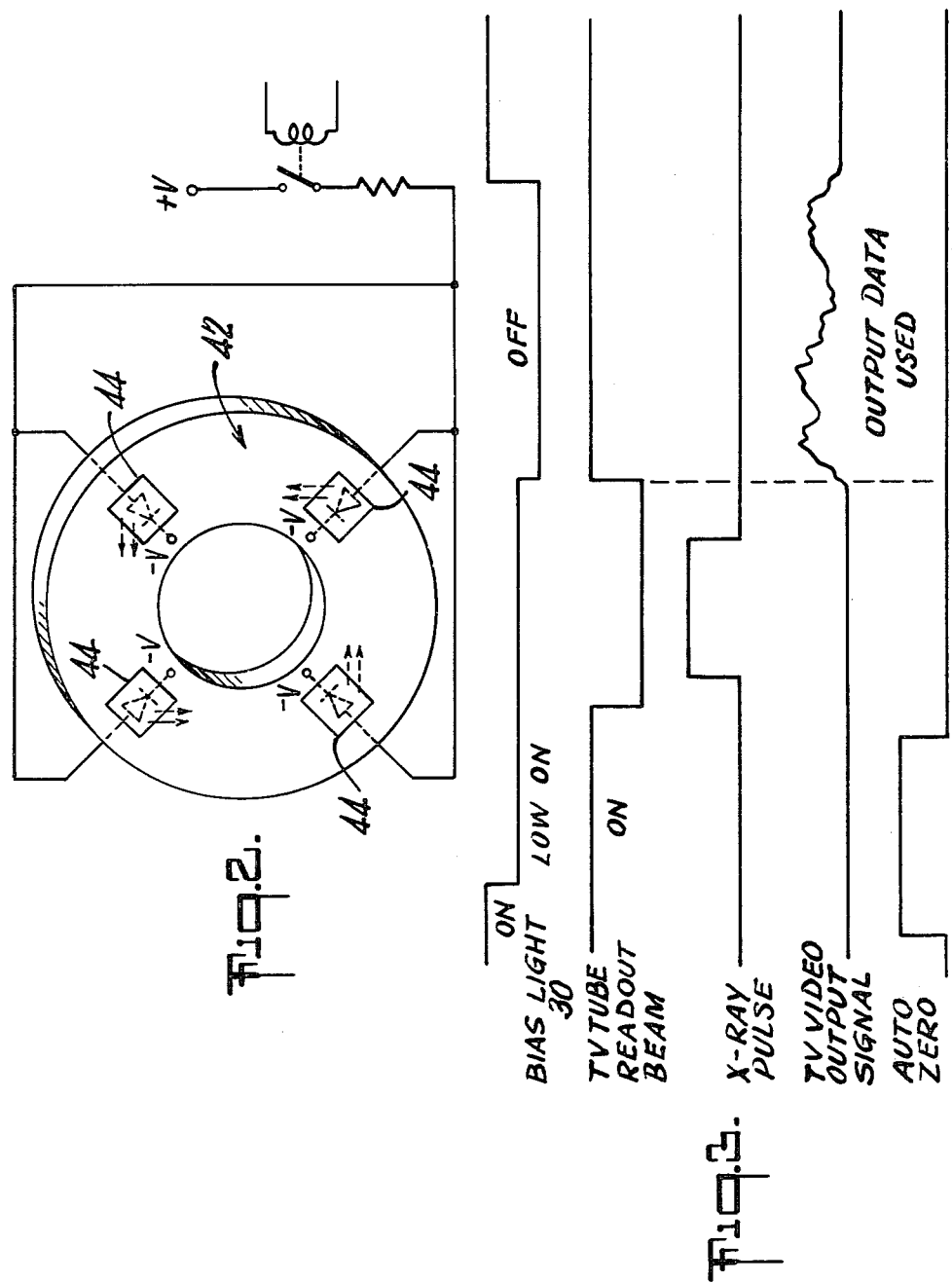

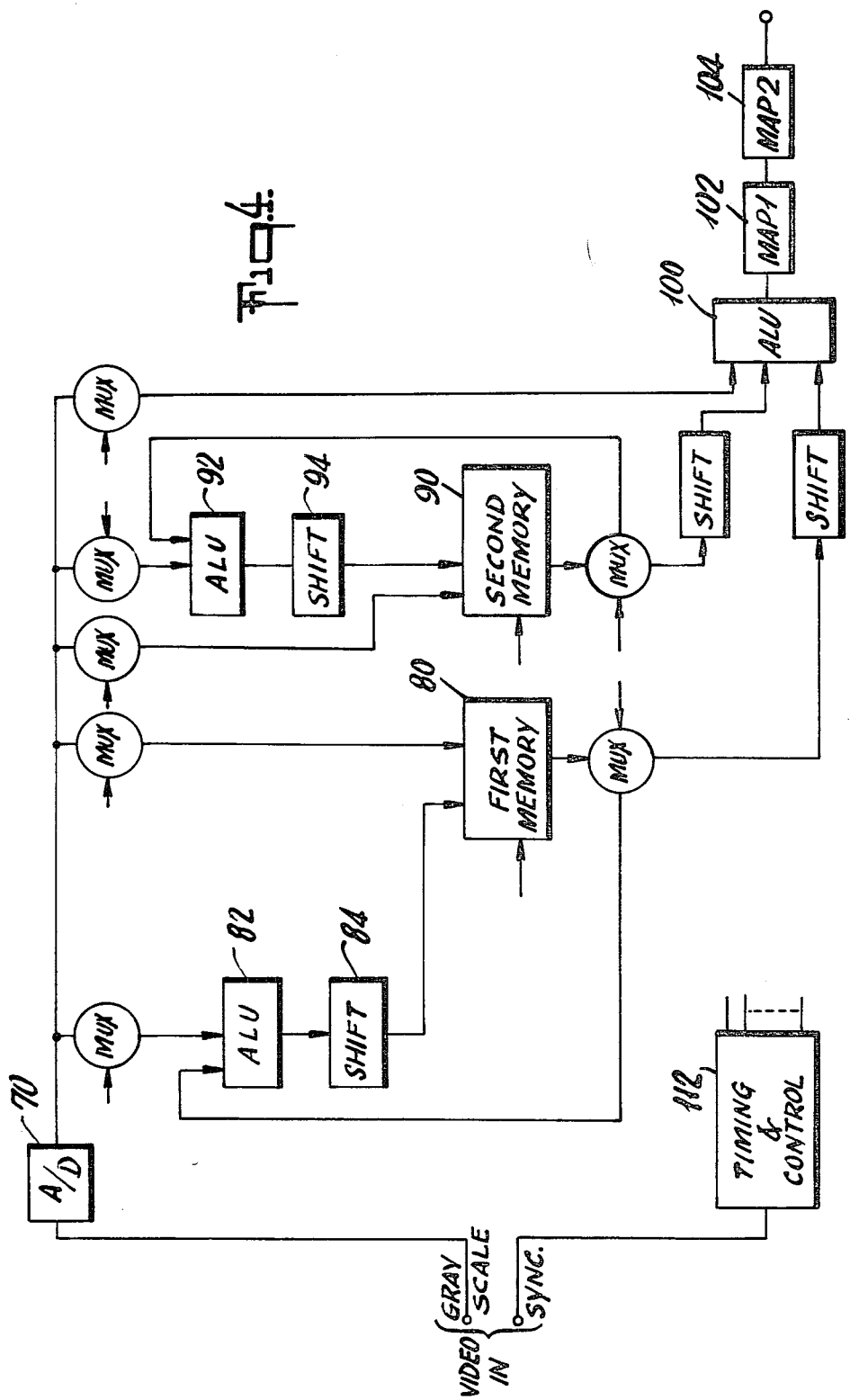

BIAS LIGHTING IN A RADIOGRAPHIC APPARATUS AND METHOD

BACKGROUND OF THE INVENTION

This invention relates to the radiographic diagnostic art and more particularly to a radiographic apparatus and method with video processing of x-ray shadowgraph images. The invention will be described with particular reference to x-ray diagnostic equipment with digital video processing. However, it will be appreciated that the invention has broader applications in other fields in which a television camera is operated intermittently to produce only a single or small number of frames of video data.

Previously, others have devised a radiographic apparatus for producing video images of x-ray shadowgraphs of a part of an examined object. See by way of example U.S. Pat. No. 3,573,461 which issued Apr. 6, 1971 to S. A. Ohlsson, U.S. Pat. No. 3,582,651 which issued June 1, 1971 to M. P. Siedband, U.S. Pat. No. 3,784,816 which issued Jan. 8, 1974 to S. Abrahamsson, or U.S. Pat. No. 3,848,130 which issued Nov. 12, 1974 to A. Macovski. In such radiographic apparatus, an x-ray source irradiates the examined object with radiation. A fluoroscopic screen converts the radiation which has traversed the object into an optical image. A television camera monitors the optical image and converts it into a plurality of frames of a video signal or image. An image processor is provided for processing the frames of the video signal to produce one or more video images for display on a video monitor.

Over the first several video frames, the amplitude of the gray scale portion of the video signal does not vary linearly with the intensity of light received from the optical image. Specifically on the first frame, a low optical intensity of light produces a very small gray scale signal. On the second frame, the same low intensity of light produces a slightly higher gray scale. Similarly over the first half a dozen or so video frames, the same low intensity of light produces progressively higher amplitudes in the gray scale signal. This transient nonlinearity in the response of the television camera to light, particularly at low levels, greatly impairs the value of the first half a dozen or so frames of the video signal. Accordingly, in the prior art radiographic devices, it has been common practice to discard a sufficient number of video frames to insure that the television camera has reached its steady state operating mode. The discarding of the first several video frames occurs every time the camera starts converting an optical image into a video signal.

This is undesirable because it increases the amount of radiation to which the object is subject. Each time the camera is actuated, the patient or object must be irradiated for an extra duration sufficient to produce the several discarded frames of data. In many instances, only a single or small number of frames of data are used to record an image in each actuation of the television camera. Thus, discarding the first several frames from the television camera may increase the patient's or object's dosage by a factor of three or more. Further in each radiation study, it is common to take several images of the examined area. The radiation source and television camera are turned off between taking each image.

One reason for the transient non-linear properties of the television camera is the capacitive properties of the target and the resistive properties of the electron beam. By way of brief review, light impinging on the target frees electrons which migrate to the inside surface of the target. The capacitive nature of the target permits the collected charge to be held by each incremental area of the target. As the beam sweeps each incremental area of the target, it causes the charge to be released and the potential across the capacitive incremental area to be discharged. The discharging of the potential across each incremental area releases a current from the target which is converted to the gray scale portion of the video signal. Under steady state operating conditions, discharging the potential across incremental areas of the target is substantially linear. However, the relatively high capacitance of the target and the relatively high resistance of the electron beam both cause the potential across an incremental area to approach zero exponentially. When the camera is first actuated, low intensity signals cause a potential which is so low that it is in the exponential region, which causes a non-linear response. After several frames, the potential across the incremental areas accumulate to a magnitude which is in the linear range.

Another reason for the transient nonlinearity of the television tube, is the nature of its target material. Commonly, the target has a large number of electron traps. When the target first receives light, some of the freed electrons fill the electron traps. This reduces the number of electrons available to produce the gray scale portion of the video signal. Particularly for low light intensities, the time required to fill substantially all of the traps and move the target into its linear responsive region, may be several frames.

In the unrelated field of television broadcasting, the obverse of the problem has been recognized. That is, when a received bright image is discontinued and the television camera views only a black or lightless field, the small accumulated potential decays exponentially to zero and the electrons filling the traps are gradually freed over several video frames. This causes a bright portion of the video field which suddenly becomes black to fade over a plurality of frames. The result is ghosts or other undesirable artifacts. To eliminate these artifacts, video broadcasters illuminate the target at a low level of optical radiation continuously while the television camera is operating. This maintains the accumulated potential in the linear range and the electron traps substantially full even when an area of the target is black. By combining an offset signal with the video gray scale signal, the constant light produced by the low level light source can be removed from the video signal. The camera's sensitivity to very low levels of intensity is, however, reduced.

SUMMARY OF THE PRESENT INVENTION

We have discovered a new and improved video system in conjunction with a radiographic apparatus which overcomes the above referenced problems and others. In accordance with the present invention, there is provided a radiographic apparatus for irradiating an object with penetrating radiation. Means are provided for converting penetrating radiation into an optical image of a radiographic shadowgraph produced by the radiation traversing the patient. A television camera views the optical image. A bias light source for irradiating the television camera before an optical image is produced on the penetrating radiation to optical image conversion means is disposed optically connected with the target of the video camera.

A principle advantage of the invention is that it reduces the amount of radiation to which an examined object is subjected. Another advantage of the present invention is that it improves the linearity of the television camera, particularly to low intensities of light. That is, the present invention shortens the transient period required by the television camera to reach its linear operating region.

BRIEF DESCRIPTION OF THE DRAWINGS

FIG. 1 illustrates a schematic view of a radiographic system in accordance with the present invention;

FIG. 2 illustrates the bias light of FIG. 1 in greater detail;

FIG. 3 illustrates the timing sequence between the actuation of various components of the radiographic system of FIG. 1; and FIG. 4 illustrates a schematic diagram of the image processor of FIG. 1.

DESCRIPTION OF THE PREFERRED EMBODIMENT

With reference to FIG. 1, a radiation source A is provided for irradiating a patient or other object to be examined with penetrating radiation such as x-radiation. The radiation attenuation caused by the three dimensional object produces a two dimension projection or shadowgraph of the radiation transmissive properties of the object. A radiation converting means for converting the x-radiation to an optical image such as an image intensifier B is disposed opposite the patient from the source of radiation. A television camera C is optically connected with the image intensifier to view the optical image displayed for converting the optical images into video signals. Video signals produced by the television camera C may be processed by a signal processor D. The frames of the video signal are processed by an image processor E to produce one or a plurality of images for display on a video monitor F.

The radiation source A comprises x-ray tube 10 for generating the x-radiation. The x-ray tube 10 is controlled by a control means or circuit 12 which supplies the appropriate biasing and power to operate the x-ray tube. The x-ray control circuit 12 enables the operator to select the KV and the milliamperes (Ma) used to drive the x-ray tube. These determine the penetrating power and intensity of radiation generated by the x-ray tube. The control circuit 12 also includes an on/off control for supplying power to the x-ray tube to start and stop the x-ray source from emitting x-radiation. An adjustable collimator 14 is disposed adjacent the x-ray tube 10 to shape a beam of radiation emitted by the x-ray source. Although x-radiation is preferred, other forms of radiation, such as gamma, are contemplated by this invention.

The image intensifier B includes a phosphorescent screen on which the optical image is displayed. In the image intensifier of the preferred embodiment, the phosphorescent screen produces light with a wavelength in the green range. Other phosphors which produce light in other wavelengths are also contemplated.

The television camera C includes a lens 20 which focuses the optical image on the screen of the image intensifier B onto the television tube. The television tube of the preferred embodiment is a lead oxide vidicon 22 which has a lead oxide (PbO) target 24. When the optical image is focused on target 24, the target material releases electrons in proportion to the intensity of light which it is receiving. This causes an electrostatic response in subregions of the target which varies a function of the intensity of the light illuminating each subregion. A swept electron beam behind the target reads the electrostatic response of each subregion of the target. Conventional television electronics 26 control the sweeping of the electron beam and convert the electrostatic response of each subregion into a video signal. The video signal includes analog gray scale portions and a synchronization information portions. The physical phenomena relating to the target capacitance-beam resistance and to electron traps in the target cause the camera, or more specifically the target, to have a transient non-linear response. This transient response occurs in the absence of significant preillumination of the camera, specifically the target, prior to receiving an image. In the transient non-linear response, the amplitude of the gray scale portion of the video signal which is produced in response to a given low intensity of light in the optical image increases over several frames. After several frames, sufficient potential is accumulated on the target and a sufficient number of electron traps are filled that the camera reaches its steady state linear operating region. In the steady state region a given intensity of light, even a low intensity, produces substantially the same amplitude in the gray scale portion of the video signal in every frame.

A bias lighting means 30 is disposed in a position from which it uniformly illuminate the target 24 of the lead oxide vidicon. The bias lighting means 30 includes a light source 32, a power supply 34 for powering the light source, and a switching means 36 for controlling the intensity and whether or not the light source 32 is supplying light. The switching means 36 may be an on/off switch. Alternately, the switching means 36 may further include a high and low intensity setting and an on/off switch for each setting.

With reference to FIG. 2, the light source 32 of the bias lighting means 30 is shown in greater detail. The light source 32 includes an annular light diffusing means 42 to provide an annular source of light for illuminating the target substantially uniformly. In the preferred embodiment, the annular light diffusing means 42 comprises a Plexiglas resin ring. The surface of the ring which is to be disposed toward the target is sandblasted or otherwise roughened to improve its light diffusing properties. Embedded in or disposed on the other surface of the Plexiglas resin annular ring are a plurality of light emitting diodes 44. A sufficient number of light emitting diodes are provided to cause the annular ring to supply light substantially uniformly. In the preferred embodiment, it has been found that four light emitting diodes are adequate, although a larger number of light emitting diodes produces greater uniformity. Light emitting diodes are chosen to produce light with a wavelength in generally the same range as the wavelength as the light produced by the image intensifier B. In the preferred embodiment, the light emitting diodes produce light with a wavelength in the green range. Light emitting diodes are chosen to supply the light because they can be controlled with very high speeds. The time required for one frame of video data being on the order of 16 milliseconds, the bias lighting means should be able to be shut off in a time period which is short compared with 16 milliseconds. Conventional incandescent or fluorescent light sources can not be shut off this quickly. The aperture in the center of the annular diffusing means 42 is sufficiently large that lens 20 focuses the image through the aperture onto target 24. However, the aperture in the center of the annular diffusing means 42 should be sufficiently small that light is supplied substantially uniformly over target 24.

With reference to FIGS. 1 and 3, a timing means or timer 48 is provided for controlling the time relationships between the actuation of the x-ray source A, the bias lighting means 30, and the television camera C. The timer 48 controls the duration for which the x-ray source A is actuated. The duration which the x-ray source is actuated is chosen to coincide with the minimum duration required to produce a satisfactory image. More specifically, for the milliampere setting of the x-ray control circuit 12 indirectly controls the intensity of the image on the image intensifier B. If the intensity of the image on the image intensifier B is sufficiently high, a single video frame produced by the television camera produces a satisfactory image. If the intensity of the image on the image intensifier B is not sufficiently high to produce a satisfactory image with a single frame, two or more frames of video data are added or averaged by the image processor E to produce an image. Accordingly, timer 48 actuates the x-ray source A to produce an x-ray pulse of the appropriate duration to cause an image on image intensifier B for an image to be produced. The timer 48 also controls the bias lighting means 30 to cause the bias lighting means to illuminate the target of the television camera for a sufficient duration before the television camera is actuated to raise the potential on the target to the linear region and to fill substantially all the electron traps in the target material. Timer 48 also actuates the television electronics 26 to enable the television camera C to produce the appropriate number of frames of video data.

The timer 48 actuates the bias lighting means 30 before the system is to process an image. One frame, that is about 16 milliseconds, before the television camera is to start converting an optical image into video data, the timer causes the television electronics 26 to blank the electron beam. The timer causes the x-ray source to be actuated for the appropriate duration to cause an optical image on the image intensifier of the appropriate duration to produce an image. The timer 48 then shuts off the bias lighting means and actuates the readout beam of the television camera causing the television camera to commense producing video output signals. After the television camera stops producing used video signals, the timer 48 again actuates the bias lighting means to illuminate the target. Alternately, the timer 48 may cause the bias lighting means to drop its intensity from a high intensity to a lower intensity to off just before the television camera C is to convert the optical image into the video signal.

The signal processor D operates on the gray scale portion of the video signals to improve the quality and linearity of the video gray scale data. The signal processor may perform various functions on the gray scale data such as combining the data with an offset signal, logarithmically compressing the gray scale data, or operating on it with more sophisticated algorithms or functions. The signal processor D includes an arithmetic transfer circuit 50 for operating on the amplitude of the gray scale portion of the signal with a predetermined function. Signal processor D further includes an automatic zero circuit 52 for combining an offset signal with the gray scale signal to adjust the reference or black level. The automatic zero circuit 52 has a switching means or switch 54 which is controlled by timer 48. In the preferred embodiment, the timer 48 closes the switch 54 while the electron beam of the television tube sweeps one frame of the target illuminated by the bias lighting means. Specifically, the last frame which the electron beam sweeps before being shut off for one frame immediately prior to producing the utilized video signal. The automatic zero circuit 52 includes an offset signal producing means 56 which substantially zeros the gray scale level of the video signal when the target 24 is illuminated only by the bias lighting means 30. When switch 54 is closed, offset signal producing means 56 adjusts the offset signal to hold the input of the automatic zero circuit 52 substantially to zero. When switch 54 is opened, the offset signal producing means sees a zero input which causes the same offset signal to be produced until the switch 54 is closed again. The offset signal producing means 56 includes a differential amplifier and a voltage storage device or capacitor to enable it to produce the offset signal for the duration which utilized video signals are produced.

With reference now to FIGS. 1 and 4, a suitable image processor is disclosed in copending application Ser. No. 138,400, of Robert H. McCarthy, filed on Apr. 8, 1980 entitled "Dynamic Image Enhancement Method and Apparatus Therefore" which is assigned to the assignee of the present application. The image processor E comprises an analog to digital converter 70 for converting analog gray scale signals received from the signal processor D into digital video signals. Alternately, the analog to digital converter may be performed by arithmetic transfer circuit 50. The digital video signals corresponding to one frame, are stored in a first memory 80. The first frame of data, if it comprises an adequate range of gray scales, may comprise a first image. Alternately, the first image may be enhanced by combining two or more frames to produce a composite image. To produce a composite image, a second or subsequent frame of data is combined with the frame of data stored in first memory 80 by an arithmetic logic unit 82. A shift means 84 is used to reduce the amplitude of the data in half by dropping the least significant bit. In this manner, stored and subsequently received frames are averaged to produce the composite image.

The invention is not restricted to the use of the image processor of FIG. 3. Other image processors, such as the digital processor shown in FIGS. 1 and 2 of U.S. Pat. No. 4,204,225 issued May 20, 1980 to Mistretta, also could be used. Digital image processing is well known and is discussed in detail in the following books: Kenneth R. Castleman, *Digital Image Processing,* Prentice-Hall, Inc., Englewood Cliffs, New Jersey, 1979; and Andrews & Hunt, *Digital Image Restoration,* Prentice-Hall, Inc., Englewood Cliffs, New Jersey, 1977.

A second or subsequent image may be stored in a second memory 90. A subsequent frame of data is stored in the second memory 90. If desirable, a composite image may be formed by combining or averaging the stored frame or image in the second memory 90 with one or more subsequent frames. For this purpose a second arithmetic logic unit 92 and shift means 94 are provided. In the preferred embodiment, the first and second memory means are 256×256 pixel matrix with 8 bits of resolution.

In the preferred embodiment, the radiographic apparatus is used to produce a differential image which represents the difference between an x-ray shadowgraph produced by an examined region of a patient before and after the patient has an x-ray opaque contrast agent introduced or injected. For this purpose a precontrast or mask image is produced and stored in the first memory 80. After the patient is injected with the contrast agent and the agent has reached the examined region, a second or post contrast image is made and stored in the second memory 90. Because it often takes about ten to fifteen seconds for the contrast agent to reach the examined region, the mask image may be obtained after the patient has been injected with the contrast agent but before the contrast agent reaches the examined region. After the mask and post contrast images are stored in the first and second memories 80 and 90, the image processor E subtractively combines these two images to produce a differential image for display on the video monitor F. To perform the subtraction, a third arithmetic logic unit 100 is provided for subtractively combining the corresponding bytes of data stored in the first and second memories. First and second mapping memories 102 and 104 are provided for standardizing the gray scale displayed on the video monitor and for calibrating the gray scale of the video monitor.

When obtaining the differential image, it is desirable to subtract two images which represent the examined area of the patient in exactly the same position. However, breathing, swallowing, cardiac motion, and other bodily functions render holding the examined region perfectly stationary very difficult. Accordingly, for this and other medical purposes, it may be desirable to produce a plurality of precontrast images and a plurality of post contrast images. A mass storage means 110, such as a video tape recorder, disc storage memory, or the like, is used. The mass storage means is connected with the first and second memories 80 and 90 to receive and store images therefrom while the patient is examined and to supply images thereto for subtractive combination after the examination is finished. A timing and control means 112 is provided for translating the synchronization portion of video signal into the appropriate addresses in the first and second memories for each incoming byte of video data. The timing and control means also controls the various multiplexing means for channeling incoming video data in the above described manner through the image processor E. The timing and control means 112 may be connected with an operator panel to enable the operator to select which frames are to be stored, the number of frames which are to be combined to form an image, and the like.

We claim:

1. In an apparatus for performing dynamic image enhancement of a portion of a subject into which a contrast agent is introduced during a diagnostic procedure, which apparatus comprises a television camera for successively generating frames of video data for producing x-ray shadowgraphic images of the subject, said television camera including a light sensitive target for receiving shadowgraphic images for converting to video data, analog to digital converting means for converting the video data from the television camera into digital video data, first memory means for storing at least one frame of video data representing a first shadowgraphic image, said first memory means being operatively connected with said analog to digital converting means, a second memory means for storing at least a second frame of video data representing a second shadowgraphic image, said second memory means being operatively connected with said analog to digital converting means, and means for subtractively combining the video data stored in said first and second memory means to produce video data representing a differential image of the difference between the first and second shadowgraphic images, the improvement comprising a bias lighting means for preilluminating said target before said target receives the shadowgraphic image for conversion into said video data and means for shutting off said bias lighting means while said target receives the shadowgraphic image.

2. A method of enhancing a video image of an x-ray shadowgraph of a subject in a radiographic apparatus, the method comprising:
   (a) illuminating the target of a television camera;
   (b) generating a first optional image of an x-ray shadowgraph of the subject and focusing the optical image on the target of the television camera;
   (c) ceasing the illumination of said target; and then
   (d) generating a video signal of the image focused on said target.

3. The method as set forth in claim 2 further comprising the steps of:
   (a) digitizing the video signal; and
   (b) storing the digitized video signal in a first digital memory.

4. The method as set forth in claim 13 further comprising the steps of:
   (a) introducing a relatively small amount of an x-ray opaque contrast agent into the subject;
   (b) illuminating said target of the television camera;
   (c) generating an optical image of an x-ray shadowgraph through the subject and introduced x-ray opaque contrast agent and focusing the optical image on said target; then
   (d) ceasing the illumination of said target of the television camera;
   (e) generating a second video signal of the image focused on said target;
   (f) digitizing said second video signal;
   (g) storing said second digitized video signal in a second digital memory; and
   (h) subtractively combining said first and second stored, digitized video signals to produce a differential video signal.

5. The method as set forth in claim 4 further comprising the step of converting said differential video signal to a video display of a difference image of difference between the shadowgraphs produced with and without the x-ray opaque contrast agent.

6. A radiographic apparatus comprising:
   (a) a radiation source for irradiating an examined object with penetrating radiation such as x-radiation;
   (b) radiation converting means for converting the x-radiation into an optical image, said radiation converting means being disposed to receive from said radiation source x-radiation which has traversed the examined object;
   (c) a television camera optically connected with said radiation converting means for converting the optical image into a video signal, said television camera having a transient non-linear response in the absence of significant illumination of said television camera prior to receiving a first optical image;
   (d) bias lighting means for pre-illuminating the television camera prior to receiving said first optical image with a sufficient intensity of light to minimize substantially the transient non-linear portion of the response of said television camera; and (e) timing means for timing the operation of said bias lighting means, said timing means shutting off said bias lighting means as or before said television camera receives the first optical image which is to be converted to the video signal.

7. A radiographic apparatus comprising:

(a) a radiation source for irradiating an examined object with penetrating radiation such as x-radiation;

(b) radiation converting means for converting the x-radiation into an optical image, said radiation converting means being disposed to receive from said radiation source x-radiation which has traversed the examined object;

(c) a television camera optically connected with said radiation converting means for converting the optical image into a video signal, said television camera having a transient non-linear response in the absence of significant illumination of said television camera prior to receiving a first optical image;

(d) bias lighting means for pre-illuminating the television camera prior to receiving said first optical image with a sufficient intensity of light to minimize substantially the transient non-linear portion of the response of said television camera; and (e) means for adding an offset signal to said video signal which offset signal is related to the amplitude of the video signal generated when said television camera is illuminated by said bias lighting means.

* * * * *

UNITED STATES PATENT AND TRADEMARK OFFICE
CERTIFICATE OF CORRECTION

PATENT NO. : 4,359,759

DATED : November 16, 1982

INVENTOR(S) : Thomas R. McBride and Joseph B. Richey

It is certified that error appears in the above—identified patent and that said Letters Patent is hereby corrected as shown below:

Column 8, Line 15, "optional" should be --optical--.
Column 8, Line 26, "13" should be --3--.

Signed and Sealed this

Twenty-second Day of February 1983

[SEAL]

Attest:

GERALD J. MOSSINGHOFF

Attesting Officer     Commissioner of Patents and Trademarks